Figure 1:
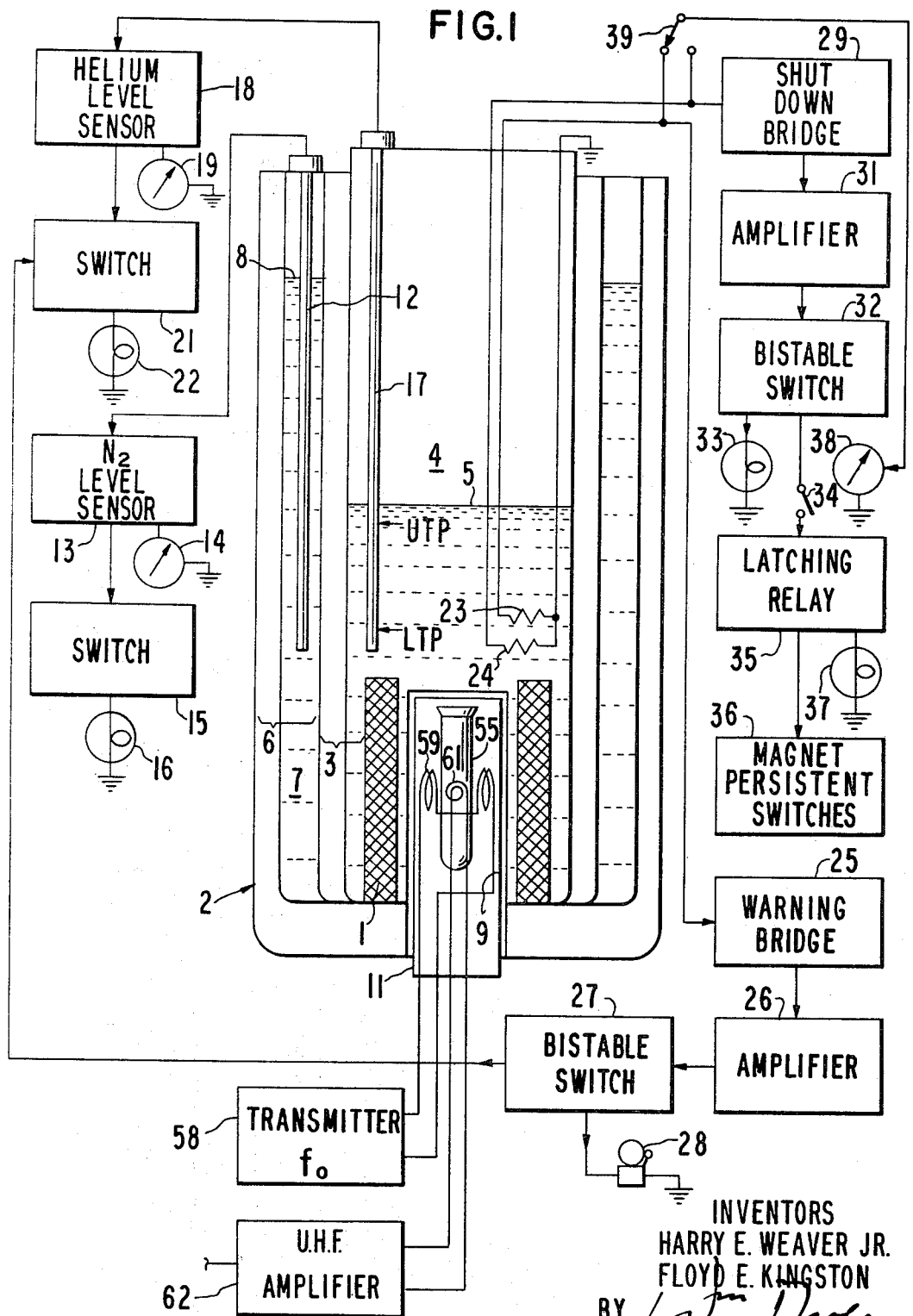

United States Patent Office 3,419,794
Patented Dec. 31, 1968

3,419,794
SUPERCONDUCTIVE MAGNET HAVING AN AUTOMATIC COOLANT LOW LEVEL WARNING AND SHUT DOWN MEANS
Harry E. Weaver, Jr., Portola Valley, and Floyd E. Kingston, Palo Alto, Calif., assignors to Varian Associates, Palo Alto, Calif., a corporation of California
Filed May 5, 1966, Ser. No. 548,010
10 Claims. (Cl. 324—.5)

The present invention relates in general to superconductive magnet systems and, more particularly, to such a system having a circuit for sensing when the magnet coolant has reached a dangerously low level, for giving the operator a warning of the low level condition, and for automatically shutting down the magnet if the low coolant level condition is not corrected, thereby preventing the superconductive magnet from undergoing an uncontrolled quench, which under certain circumstances might produce a catastrophic failure of the magnet. Such a magnet system, having the automatic warning and shut down features, is especially useful for, but not limited to, use with gyromagnetic resonance spectrometers that may be required to operate for long periods of time without constant operator attention.

Heretofore, superconductive magnet systems have been provided with liquid coolant level monitors that will give a continuous meter reading of the liquid coolant level within the opaque cryostat enveloping the superconductive magnet. Such a liquid helium level monitor forms the subject matter of and is claimed in copending U.S. patent application 530,543 filed Feb. 28, 1966, and assigned to the same assignee as the present invention. While such monitors are useful for giving the operator a continuous reading of the liquid helium level in the cryostat they have not, heretofore, included provisions for shutting down the solenoid in a controlled manner in the event the operator failed to correct the low helium level condition.

In the present invention, a pair of liquid coolant, point level sensors are positioned in the solenoid magnet coolant chamber of the magnet's cryostat in such a manner as to sense when the liquid coolant is approaching a dangerously low level and to actuate an automatic operator warning device. In the event the liquid coolant level continues to recede, one of the point level sensors of the pair is uncovered thereby actuating an automatic magnet shut down circuit which causes the magnet to be shut down in a controlled manner dumping substantially all of its stored energy into an external load, thereby preventing damage to the solenoid which might otherwise be incurred if the magnet had quenched in an uncontrolled manner.

The principal object of the present invention is the provision of an improved superconductive magnet system.

One feature of the present invention is the provision of a sensor for sensing a low liquid level condition in the coolant chamber of the cryostat containing the superconductive magnet and for actuating an automatic magnet shut down circuit for shutting down the magnet in a controlled manner, whereby damage to the magnet is prevented.

Another feature of the present invention is the same as the preceding feature wherein the level sensor is a point level sensor which is immersed in the liquid coolant for the magnet and which when uncovered by the receding liquid coolant produces a signal for actuating the auomatic magnet shut down circuit.

Another feature of the present invention is the same as the preceding feature including the provision of a second point level sensor disposed above the other sensor and which when uncovered by the receding liquid coolant, produces a signal which actuates an alarm circuit giving the operator a warning of the low coolant level condition of the cryostat, whereby remedial action may be taken in timely manner.

Another feature of the present invention is the same as any one or more of the preceding features wherein the superconductive magnet is a solenoid winding having a bank of diodes disposed externally of the cryostat with diodes of the bank connected across various winding segments of the solenoid and wherein the solenoid includes a plurality of superconductive bypass conductors connected in shunt with the magnet and diodes for operating the magnet in the persistent mode. The magnet system of this feature further includes persistent switches connected in the bypass circuit portions, and wherein the shut down circuit actuates the persistent switches for switching the magnet current into the external diodes, whereby the stored energy of the magnet is diverted to the external diode bank and dissipated therein in a controlled manner without causing the magnet to undergo a transition to the normal conductive state during the shut down process.

Figure 2:
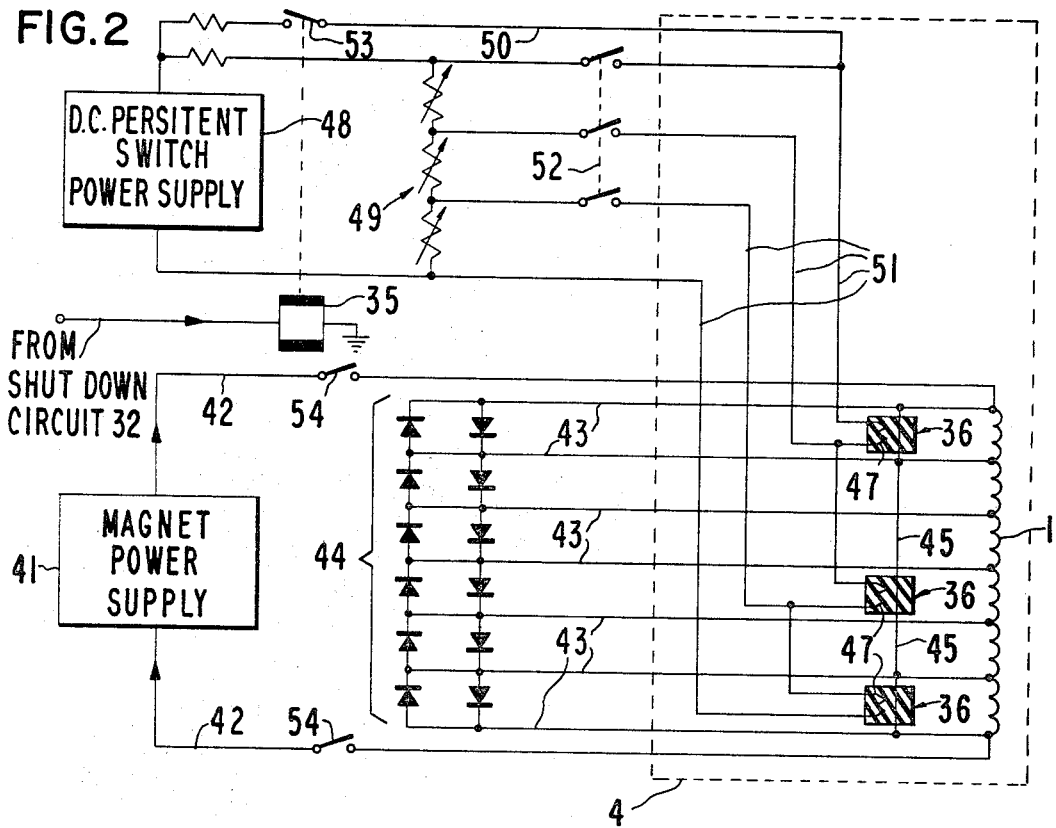
Figure 3:
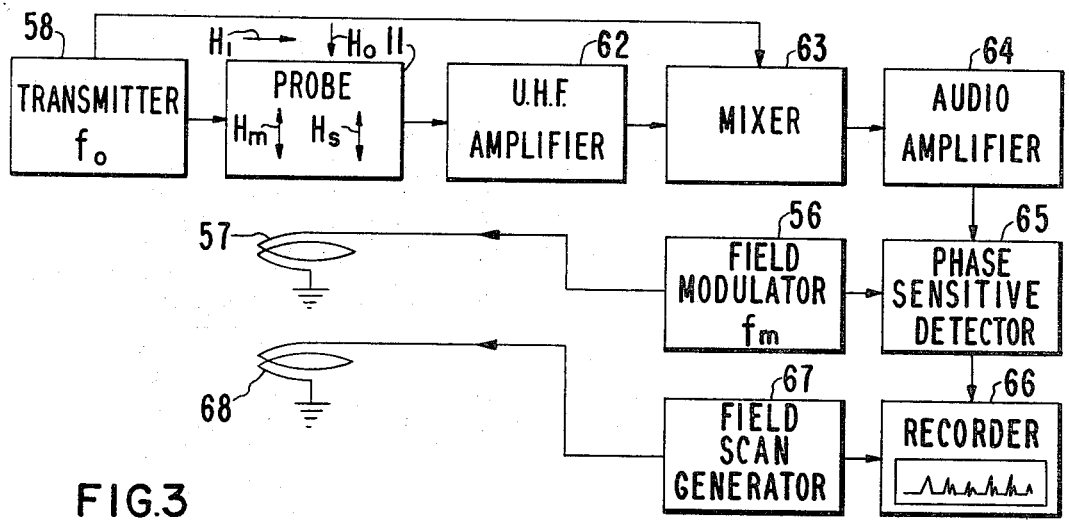

Other features and advantages of the present invention will become apparent upon a persual of the following specification taken in connection with the accompanying drawings wherein:

FIG. 1 is a schematic diagram, partly in block diagram form, of a superconductive magnet protection system, employing features of the present invention, FIG. 2 is a schematic circuit diagram, partly in block diagram form, of the superconductive magnet of FIG. 1, and FIG. 3 is a schematic block diagram of a gyromagnetic resonance spectrometer employing the magnet system of FIGS. 1 and 2.

Referring now to FIG. 1 there is shown the superconductive magnet system with its monitoring and protection circuits embodying features of the present invention. A superconductive solenoid magnet 1, more fully described with regard to FIG. 2, is enveloped by its cryostat 2 for cooling the solenoid 1 to its superconductive temperature as of 4° K. The cryostat 2 includes a liquid helium Dewar 3 comprising a central liquid helium chamber 4 containing the solenoid 1 immersed in liquid helium coolant 5. A liquid nitrogen Dewar 6 surrounds the liquid helium Dewar 3 and includes a liquid nitrogen chamber 7 containing liquid nitrogen 8.

The cryostat 2 includes an axially directed reentrant bore 9 extending into the cryostat from the bottom. The bore 9 is open to the atmosphere and extends inside of the solenoid 1 to permit access to the axial field $H_0$ produced by the solenoid 1. A field utilization probe 11, such as for example a gyromagnetic resonance probe structure, is axially inserted within the bore 9 for use of the magnetic field $H_0$. The probe 11 and its associated electronics will be more fully described below with regard to FIG. 3.

The liquid nitrogen coolant level is monitored in the liquid nitrogen Dewar 6 by means of a liquid level monitor circuit. This circuit includes a conventional capacitance probe structure 12 immersed in the liquid nitrogen chamber 7. Such a probe and circuit form the subject matter of and are claimed in copending U.S. application 530,543, filed Feb. 28, 1966, and assigned to the same assignee on the present invention. The liquid level output signal of the probe 12 is fed to a liquid nitrogen level sensor circuit 13 for producing an output signal which is fed to a meter 14 for continuously indicating the liquid nitrogen level. Another output from the sensor circuit 13 is fed to a switch circuit 15 which actuates a warning light 16 when the liquid nitrogen level recedes below some predetermined level.

Likewise, a similar probe 17 is immersed in the liquid helium chamber 4. The output signal from the helium level probe 17 is fed to a conventional liquid helium level sensing circuit 18 which supplies one output signal to a liquid helium level indicating meter 19 for displaying the helium liquid level. Another output of the helium level sensing circuit 18 is fed to a switch circuit 21 which actuates a warning light 22 to half brilliance when the helium liquid level recedes below a predeterminned lower trip point, LTP, as indicated by the lower arrow adjacent the probe 17. The switch circuit 21 includes a conventional bistable flip-flop circuit with a substantial dead zone such that the light 22 remain lighted until the liquid helium level rises above the upper trip point, UTP, as indicated by the upper arrow adjacent the probe 17.

A pair of separate liquid helium point level sensors 23 and 24 such as 1/10 watt, 100Ω, carbon resistors are disposed, one above the other, at a predetermined level in chamber 4 which is slightly above the uppermost extent of the superconductive solenoid 1. As an alternative the point level sensors 23 and 24 may comprise a superconductive element having a transition temperature just above liquid helium temperature of 4.2° K. such as tantalum having a transition temperature of 4.4° K., thereby avoiding evaporation of helium in use. The uppermost point level resistor 23 is connected in one arm of a helium low level warning bridge circuit 25 and biased with a small D.C. or A.C. voltage as of 1.2 v. When the liquid helium level recedes below the upper resistor 23 the resistance of the resistor 23 changes appreciably and thus produces an output signal from the bridge 25 which is fed to an amplifier 26 and thence to a switch circuit 27. The warning switch circuit 27 is of the same type as switch circuit 21 previously described, except that the warning switch network 27 has a negligible dead zone because resistor body 23 is 0.080″ in diameter and thus compresses the UTP and LTP. Thus, any appreciable input signal to warning switch circuit 27 produces an output to actuate a bell alarm 28. A second output of the warning switch circuit 27 is fed to the liquid helium level switch circuit 21 to produce an output which switches the warning light 22 from half brilliance to full brilliance.

The second point level sensing resistor 24 is located about 3/8″ below the warning sensor 23. At normal rates of liquid helium consumption it would typically take about two hours, after uncovering the first sensor, for the liquid helium level to recede sufficiently to uncover the second or shut down point level sensor 24. Sensor 24 is connected in one arm of a conventional shut down bridge circuit 29 of the same type as the warning bridge circuit 25 and biased with either A.C. or D.C. current, all as previously described above.

When the helium level recedes below the level of the shut down resistor 24, the bridge 29 is unbalanced in a certain direction producing an output which is fed to an amplifier 31 and thence to a bistable shut down switch circuit 32 of the same type as, and biased the same as, the warning switch network 27, described previously. One output of the switch network 32 actuates a monitor light 33. Another output of the switch network 32 is fed via an arming switch 34 to a latching relay 35 for closing the superconductive magnet's persistent switch circuits 36 to shut down the superconductive magnet 1, as described more fully below with regard to FIG. 2. The latching relay 35 also closes the circuit to a light 37, thereby indicating that the magnet has been shut down. The purpose of the arming switch 34 and monitor light 33 is to allow the operator to deactivate the shut down mechanism during the helium fill operation such that the magnet is not inadvertently shut down during the fill operation. When the monitoring light is unlighted when the arming switch 34 is closed and the automatic shut down mechanism is then armed. A meter 38 is connected to a switch 39 for switching into either of the shut down or warning bridge circuits 29 and 25, respectively, for monitoring their degree of balance.

Referring now to FIG. 2 there is shown the circuit for the superconductive solenoid magnet 1. The solenoid 1 is, for example, 12″ long and 1.5″ in inside diameter and comprises 120,000 feet of copper jacketed NbZr wire immersed in the liquid helium 5 of chamber 4. The solenoid 1 is energized with, for example 20 amps of current from a current regulated power supply 41. A pair of heavy copper leads 42 interconnect the power supply 41 and the solenoid 1. The solenoid winding 1 is tapped at several intervals, as of every 12,000 feet, along its length and leads 43, connecting to the taps, are brought out of the cryostat 2 to a bank of diodes 44. Pairs of diodes 44 are connected in parallel across each tapped segment of the solenoid winding with one diode connected to conduct in one direction and the other diode connected to conduct in the opposite direction. The diodes 44 are each capable of conducting the full magnet current, as of 20 amps. The diodes 44 serve to protect the solenoid in case of an inadvertent quench of the magnet and also serve as an external load into which the magnet's stored energy is dumped during a normal shut down of the magnet.

Three superconductive bypass wires 45 are connected across the solenoid 1. One wire 45 is connected across the terminals of each end section of the solenoid windings and the remaining wire is connected across the remainder or central section of the windings. The persistent switches 36 are connected in each of the bypass wires 45 for switching the bypass wires 45 back and forth, as desired, between the normal conductive state and the superconductive state.

The persistent switches 36 include a thermally nonconductive dielectric block 46 through which the bypass wire passes. A heating element 47 is embedded in the dielectric block 46 for heating same, when energized, to produce a transition of the bypass wire 45 from a superconductive state to a normal conductive state. When the heater 47 is deenergized the liquid helium cools the bypass wire within about 1 to 2 seconds, to a superconductive state. Persistent switch heater current is supplied from a power supply 48 as tapped off a voltage divider network 49. Leads 51 carry the heater current to the heater elements 47 from the voltage divider network 49 and via ganged switches 52 for isolating the heater power supply 48 from the persistent switches 36 when the solenoid 1 is operating in the persistent mode. A second lead 50 connects the persistent switch heater elements 47 in series with the power supply 48 via a switch 53 which is closed in response to a shut down signal from shut down circuit 32 operating latching relay 35.

In operation, the persistent switches 36 are energized by closing switch 52 to produce a finite resistance in the bypass wires 45 by heating them above their superconducting temperature. Switches 54 in the leads 42 between the magnet power supply and the solenoid 1 are closed to energize the solenoid 1 to a desired field intensity as, for example, 60 kg. at 20 amps. The persistent switches 36 are then deenergized and the heater power supply disconnected by opening switches 52. When the bypass wires have cooled to their superconducting temperature the main magnet power supply current is reduced to zero and the switches 54 opened and the solenoid 1 is thereby switched into the persistent current mode. In this mode the current flows in closed superconductive loop circuits through the solenoid winding 1 and back around the solenoid through the bypass wires 45.

When the shut down sensor 24 is uncovered, producing the shut down output signal, the heaters 47 of the persistent switches 36 are energized by closing the persistent heater supply switch 53 in response to the shut down output signal fed to relay 35. Thus, the bypass wires 45 are heated above their superconducting temperature and thus switched into their normal conducting state, thereby presenting a finite resistance to the magnet current. This produces a voltage across the diodes 44 causing the forward biased diodes to conduct thereby shifting the return magnet current through the diode bank 44. The diodes 44 offer a small but finite resistive loss to the current thereby causing the stored energy of the magnet to be dumped into the diode bank over a period of time as of 120 to 240 seconds without causing the magnet to undergo a transition to the normal conductive state in the shut down process.

Referring now to FIG. 3 there is shown a gyromagnetic resonance spectrometer. A sample of matter to be analyzed is contained in a glass vial 55 (see FIG. 1) and immersed in the polarizing magnetic field $H_o$ produced by the solenoid 1. The sample vial 55 is contained within the probe structure 11. A field modulator 56 modulates the polarizing magnetic field $H_o$ via coil 57 with an alternating field component $H_m$ at a suitable audio frequency $f_m$ as of 10 kHz. An ultra high frequency transmitter 58 supplies an alternating magnetic field component $H_1$ to the sample at right angles to the polarizing field $H_o$ and at a frequency $f_o$ which is displaced from the gyromagnetic resonance frequency of the sample by the field modulation frequency $f_m$. The transmitter field is applied via coils 59 (see FIG. 1).

The combined effect of the field modulation $H_m$, polarizing field $H_o$, and ultra high frequency field $H_1$ is to produce gyromagnetic resonance of the sample. A receiver coil 61, aligned at right angles to the transmitter coil 59, picks up the resonance signal emanating from the sample and feeds it to an ultra high frequency amplifier 62 and thence to one input of a mixer 63. The mixer 63 mixes the resonance signal with a sample of the transmitter signal to transpose the resonance signal to the field modulation frequency $f_m$ which is then fed to an audio amplifier 64 and thence to one input of a phase sensitive detector 65. The phase sensitive detector compares the resonance signal at $f_m$ with a sample of the field modulation signal at $f_m$ to produce a D.C. resonance output signal which is fed to a recorder 66. The total polarizing field intensity $H_o$ is scanned by superimposing upon the polarizing field $H_o$ a small scan component $H_s$ produced by a field scan generator 67 which drives a field scan coil 68. A sample of the field scan output is fed to the recorder 66 for recording the resonance signal as a function of the field scan signal to obtain a recorded output resonance spectrum of the sample under analysis.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A superconductive magnet system including, means forming a superconductive solenoid magnet, means forming a cryostat enveloping said solenoid means and having a liquid coolant chamber for containing liquid coolant in which said solenoid means is immersed, liquid level sensing means disposed in said liquid coolant chamber of said cryostat for producing an output signal when the liquid coolant in said chamber has receded to a certain predetermined level, means responsive to the output signal for shutting down the solenoid and diverting the stored energy of said solenoid to a load external of said cryostat, whereby damage to said solenoid is prevented which might otherwise occur if said solenoid were allowed to undergo a superconducting to normal conductive state transition.

2. The apparatus of claim 1 including, second means disposed in said liquid coolant chamber of said cryostat for producing an output signal when the liquid coolant in said chamber has receded to a certain predetermined level above said first predetermined level, and means responsive to the output signal of said second means for actuating an operator warning device, whereby the operator may take timely remedial action to prevent an automatic shut down of the magnet system.

3. The apparatus of claim 1 wherein said liquid level output signal producing means includes a sensing element immersed at a certain predetermined level in said liquid coolant chamber and which changes its resistance when the liquid coolant recedes to the level where said element is uncovered by the liquid coolant.

4. The apparatus of claim 2 wherein said second liquid level output signal producing means includes a carbon resistor immersed at a certain predetermined level in said liquid coolant chamber and which changes its resistance when the liquid coolant recedes to the level where said resistor is uncovered by the liquid coolant.

5. The apparatus of claim 1 wherein said solenoid magnet includes a superconductive bypass circuit portion for operating said solenoid in the persistent current mode, means forming a switch connected in said bypass circuit portion for switching said superconductive bypass circuit portion from a superconductive state to a non superconductive state in response to an input signal, means forming a diode load connected across said superconductive solenoid and disposed externally of said cryostat means for dissipating the stored energy of said solenoid, and means for energizing said switch means in response to the coolant level output signal for switching the persistent mode current of said solenoid through said diode load means, whereby the stored energy of said solenoid means is diverted to and dissipated in said diode load without causing said superconductive solenoid to suffer a superconducting-to-normal conducting state transition in the magnet shut down process.

6. The apparatus of claim 5 including second means disposed in said liquid coolant chamber of said cryostat means for producing an output signal when the liquid coolant level in said chamber has receded to a certain predetermined level above said first predetermined level, and means responsive to the output signal of said second means for actuating an operator warning device, whereby the operator may take timely remedial action to prevent an automatic shut down of the magnet system.

7. The apparatus of claim 1 including in combination, means for immersing a gyromagnetic resonance sample of matter to be analyzed in the magnetic field of said solenoid magnet means, and means for exciting and detecting gyromagnetic resonance of the sample under analysis.

8. The apparatus of claim 3 wherein said sensing element is a carbon resistor.

9. The apparatus of claim 3 wherein said sensing element is a superconductive element which has a transition temperature to the non-superconducting state within a degree of 4.2° K.

10. The apparatus of claim 9 wherein said superconductive sensing element is tantalum.

References Cited

UNITED STATES PATENTS

| 3,270,247 | 8/1966 | Rosner | 317—13 |
| 3,305,699 | 2/1967 | Waltrous | 317—13 |
| 3,336,526 | 8/1967 | Weaver | 324—.5 |

RUDOLPH V. ROLINEC, *Primary Examiner.*

MICHAEL J. LYNCH, *Assistant Examiner.*

U.S. Cl. X.R.

317—16, 40; 335—216